United States Patent [19]

Kooiman

[11] 4,161,146

[45] Jul. 17, 1979

[54] STACKING DEVICE

[75] Inventor: Pieter L. Kooiman, Achterambachtseweg, Netherlands

[73] Assignee: Avedko B.V., Dordrecht, Netherlands

[21] Appl. No.: 856,860

[22] Filed: Dec. 2, 1977

[30] Foreign Application Priority Data

Aug. 25, 1977 [NL] Netherlands ................. 7709380

[51] Int. Cl.² .................. A47B 9/02; A47F 7/00
[52] U.S. Cl. .................. 108/136; 211/49 D; 312/71
[58] Field of Search ........... 248/149, 154, 312, 172; 211/49 D; 312/306, 319, 91; 108/136

[56] References Cited

U.S. PATENT DOCUMENTS

| 1,762,805 | 6/1930 | Tucker | 248/149 |
|---|---|---|---|
| 1,785,745 | 12/1930 | Pilling | 248/154 |
| 1,902,423 | 3/1933 | Seltzer | 248/149 X |
| 3,276,830 | 10/1966 | Vorndran | 211/49 D |
| 3,331,337 | 7/1967 | MacKay | 211/49 D |
| 3,357,760 | 12/1967 | Shelley et al. | 312/306 X |
| 3,428,185 | 2/1969 | Vorndran | 108/136 X |
| 3,717,397 | 2/1973 | Cummings | 312/71 |
| 3,738,722 | 6/1973 | Kooiman | 312/71 |
| 3,741,512 | 6/1973 | Olsson | 108/136 X |
| 3,863,576 | 2/1975 | Olsson | 108/136 |

Primary Examiner—James T. McCall
Attorney, Agent, or Firm—Andrus, Sceales, Starke & Sawall

[57] ABSTRACT

A device is described for dispensing articles, such as trays, plates, etc., while maintaining the uppermost article of the stack at a predetermined dispensing level independent of the number of articles in the stack. The novel device comprises an upper annular member through which the articles are dispensed, a plurality of vertical post members, each having at the upper end thereof an outwardly turned inverted U-shaped portion with a short outer leg portion, said short outer leg portions supporting said annular member and an article carrier tray vertically slidable beneath said annular member while being guided by said vertical post members.

8 Claims, 4 Drawing Figures

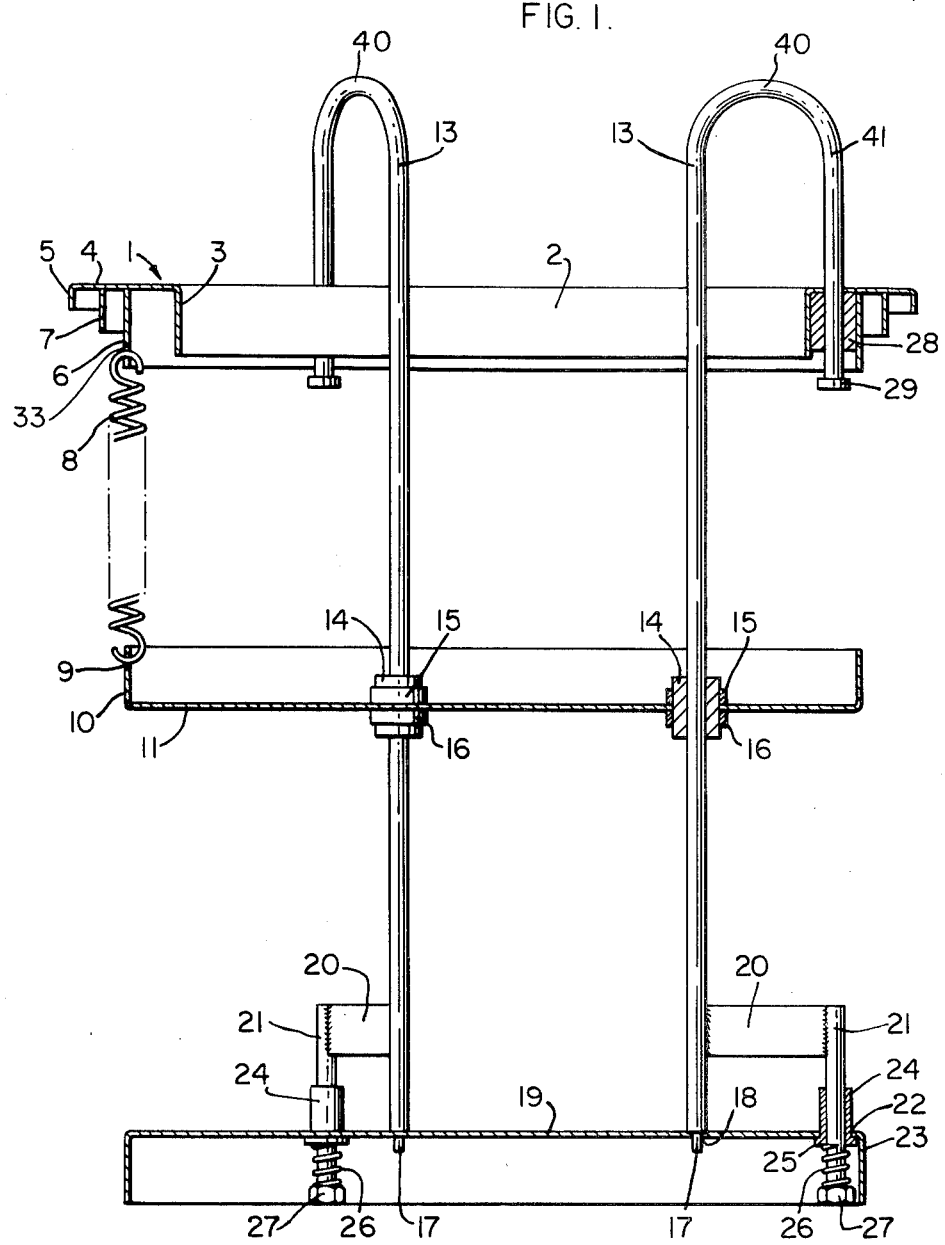

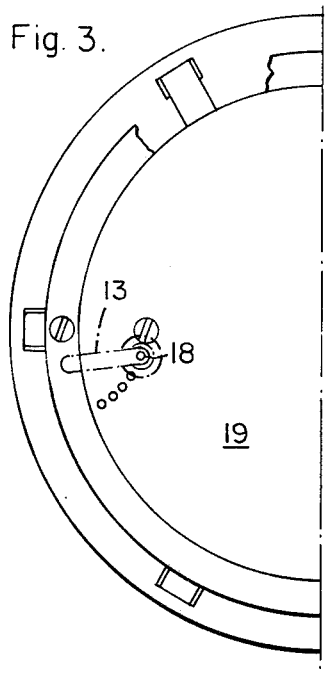
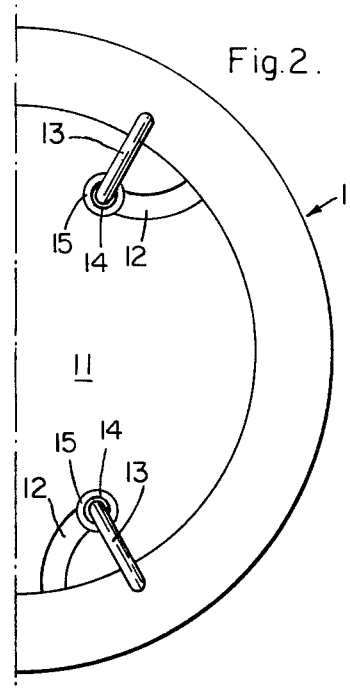
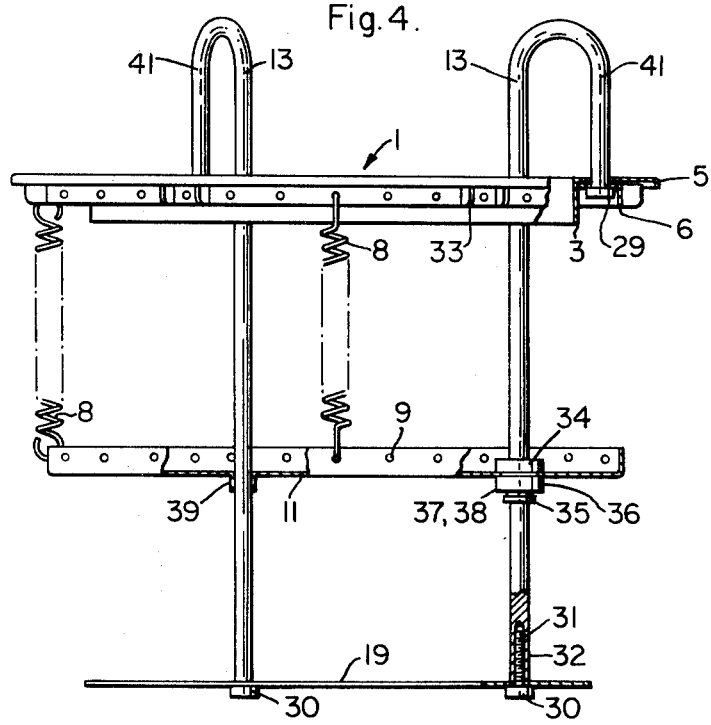

STACKING DEVICE

This invention relates to a device for dispensing articles, such as trays and plates, while maintaining the uppermost article of the stack at a predetermined dispensing level independent of the number of articles in the stack.

A device of the above type is known, for example as described in Canadian Pat. No. 949,644. In such a known device, a number of stationary posts of U-shaped cross section are used as guides for a support carriage having profile wheels which travel on the posts. The upper ends of these posts are connected to an annular member and the carrier is suspended beneath the annular member by means of springs. The posts are laterally adjustable depending on the size of the article being carried.

It is the object of the present invention to provide a simplified design for a device of the above type which will be less expensive to manufacture and more reliable in use.

The main feature of the present invention has to do with the configuration of the posts, these being mounted vertically, but each having at the upper end thereof an outwardly turned inverted U-shaped portion with a short outer leg portion. These short outer leg portions support the upper annular member and the article carrier tray can then vertically slide beneath the annular member while being guided by the vertical post members.

Thus, the present invention in its broadest aspect comprises a device for dispensing articles from a stack while maintaining the uppermost article of the stack at a predetermined dispensing level independent of the number of articles in the stack. The device comprises an upper annular member through which the articles are dispensed, a plurality of vertical post members, each having at the upper end thereof an outwardly turned inverted U-shaped portion with a short outer leg portion, said short outer leg portions supporting said annular member and an article carrier tray vertically slidable beneath said annular member while being guided by said vertical post members.

The outwardly turned portions of the posts are preferably half-circular in configuration and this assists in providing easy access to the articles. It is also desirable to utilize the posts themselves as the vertical edges of the carrier chamber for the articles.

BRIEF DESCRIPTION OF THE DRAWING

Certain preferred embodiments of the invention are illustrated by the accompanying drawings in which:

FIG. 1 is a schematic side elevation in partial section of one embodiment of the invention;

FIG. 2 is a top plan view of one half of the embodiment of FIG. 1;

FIG. 3 is a bottom plan view of one half of the embodiment shown in FIG. 1; and

FIG. 4 is a side elevation in partial section showing an alternative embodiment of the invention.

DETAILED DESCRIPTION OF THE PREFERRED EMBODIMENT

One embodiment of the device is shown in FIGS. 1, 2 and 3. It includes an annular flange member 1 at the top having a central opening 2 defined by an inner ring flange 3. The annular flange member 1 includes a flat top face 4 as well as a shallow outer ring flange 5, a deep central ring flange 6 and an intermediate central ring flange 7. The deep ring flange 6 has a plurality of holes 33 into which the upper ends of coil springs 8 are hooked.

The lower ends of the coil springs 8 are hooked into holes 9 in the peripheral edge 10 of a carrier tray 11. This carrier tray carries the articles being dispensed.

The carrier tray 11 is guided for vertical movement by means of vertical posts 13. These are tubular posts which extend through curvilinear slots 12 in carrier tray 11. To assure easy movement of the carrier tray 11, guide bushings 14 are fitted between the tray and the posts 13. These bushings are held in place by means of an upper clip 15 and a lower clip 16.

The bottom ends of the posts 13 have projecting pins 17 which can be mounted within holes 18 in a bottom support 19. As will be seen from FIG. 3, a series of these holes 18 can be positioned in a curving path, with the appropriate hole being selected by the desired spacing of the posts 13. Normally three equally spaced posts 13 are used and the spacing of these posts is determined by the size of the article being dispensed. Thus, the posts are positioned such as to provide guide paths defining a chamber for the articles.

In order to provide a strong support for the posts 13 in the bottom support 19, each post includes a horizontal brace 20 welded thereto with the outer end of each brace 20 having welded thereto a pin member 21. Each pin member 21 extends through a hole 22 in the bottom support 19 in close proximity to the peripheral edge 23 of the bottom support 19. A sleeve member 24 surrounds the pin 21 within the hole 22. It is retained from upward movement by means of a protruding collar 25. A nut 27 retains a coil spring 26 at the lower end of the pin 21. This spring arrangement makes it possible to pull up on the bracket 20 so that pin 17 can be removed from one hole 18 and placed in another of the holes 18.

The upper end of each post 13 includes an arcuate portion 40 forming an inverted U-shaped portion including a short outer leg member 41. This outer leg member 41 serves as a support for the annular flange 1 by means of sleeve 28 and nut 29. Since the leg portions 41 are free to turn within the sleeves 28, it will be seen that when the bottom ends of the posts 13 are adjusted along the holes 18, these posts will move through the arcuate slots 12 in carrier tray 11 and will swing within sleeves 28. These are adjusted to provide a vertical passage slightly larger than the dimensions of the article being dispensed. It will be seen that with this arrangement the articles to be dispensed can easily be loaded into the space on the carrier tray 11 and can also be easily removed. In normal use, the ring flanges 3, 6 and 7 are within a hole in a counter or table with the outer ring flange 5 resting on the surface of the table. The bottom support 19 will normally sit on the floor beneath the counter or table.

An alternative embodiment is shown in FIG. 4 where once again three vertical cylindrical posts 13 are used but with minor modifications in the structural details. In this embodiment the lower ends of the posts 13 are bolted directly to the bottom support 19 by means of nuts 30 screwed onto the ends of bolts 31 extending into a tapped hole 32 in each post.

The upper annular flange 1 includes fewer ring flanges than in the embodiment of FIG. 1 and is positioned within the hole in the counter or table by means of brackets.

For easy and free movement of the carrier tray 11 on the posts 13, a collar 34 is positioned above carrier 11, with a sleeve 35 extending through the carrier on which a ring member 36 is forced. This ring is fixed by means of a clip 37 biased within a groove 38 in the cylinder.

A separate embodiment of a guide bushing is shown by means of the arrangement 39 on the left hand post of FIG. 4. This guide bushing is pressed out of the plate material of the carrier 11.

The device according to this invention can be supplied in the form of loose components which can easily be assembled by the customer. This greatly saves in transportation and storage costs.

The embodiments of the invention in which an exclusive privilege or property is claimed are defined as follows:

1. A device for dispensing articles from a stack while maintaining the uppermost article of the stack at a predetermined dispensing level independent of the number of articles in the stack, said device comprising an upper annular member through which the articles are dispensed, a plurality of vertical post members, each having at the upper end thereof an outwardly turned inverted U-shaped portion with a short outer leg portion, said short outer leg portions supporting said annular member and an article carrier tray vertically slidable beneath said annular member while being guided by said vertical post members.

2. The device according to claim 1 including spring means between said upper annular member and a peripheral edge of said carrier tray, adapted to bias said tray toward said upper annular flange.

3. The device according to claim 1 wherein the vertical post members pass through curvilinear slots in said carrier tray.

4. The device according to claim 3 wherein the bottom of said vertical post members are adjustably mounted on a support floor.

5. The device according to claim 4 wherein there are at least three vertical post members, these being radially movable to provide a vertical article passage of variable lateral dimensions.

6. The device according to claim 1 wherein said vertical post members have round cross-sections.

7. The device according to claim 4 wherein each post has a pivot pin running parallel to said post located in vertical alignment with said short outer leg portion and joined to said post by a connecting link, said pivot pin being journalled in said support floor and containing bias means permitting limited upward vertical movement of said post, said post having locating means on the lower end thereof coacting with locating means on said support floor for positioning said post at a desired location on said support floor.

8. The device according to claim 4 wherein said vertical post members may be adjustably bolted to said support floor.